(12) United States Patent
Vezzoli

(10) Patent No.: US 8,613,346 B2
(45) Date of Patent: Dec. 24, 2013

(54) DEVICE FOR ADJUSTING THE FREE STROKE IN HYDRAULIC BRAKES OF BICYCLES OR MOTORCYCLES

(75) Inventor: Giancarlo Vezzoli, Iseo (BS) (IT)

(73) Assignee: Formula S.r.l., Prato (IT)

( * ) Notice: Subject to any disclaimer, the term of this patent is extended or adjusted under 35 U.S.C. 154(b) by 248 days.

(21) Appl. No.: 12/958,561

(22) Filed: Dec. 2, 2010

(65) Prior Publication Data

US 2011/0135521 A1    Jun. 9, 2011

(30) Foreign Application Priority Data

Dec. 4, 2009   (IT) .................. FI2009A0254

(51) Int. Cl.
  *B62L 3/00* (2006.01)
(52) U.S. Cl.
  USPC ............. 188/24.22; 188/344; 74/501.5 H
(58) Field of Classification Search
  USPC ............. 188/24.22, 24.19, 24.11, 344, 352; 74/488, 500.5, 501.5 H, 502.2, 503; 417/490, 501, 547
  See application file for complete search history.

(56) References Cited

U.S. PATENT DOCUMENTS

| 6,336,525 | B1 * | 1/2002 | Leng ............... 188/24.19 |
| 6,804,961 | B2 * | 10/2004 | Lumpkin ............ 60/588 |
| 7,360,632 | B2 * | 4/2008 | Laghi .............. 188/344 |
| 2002/0070084 | A1 * | 6/2002 | Chou .............. 188/24.11 |
| 2010/0052415 | A1 * | 3/2010 | Vezzoli et al. ........ 303/10 |

FOREIGN PATENT DOCUMENTS

| EP | 1514757 A1 * | 3/2005 |
| GB | 2141498 A * | 12/1984 |
| IT | 218037 | 12/1988 |
| WO | WO-2007/111510 A1 * | 10/2007 |

* cited by examiner

*Primary Examiner* — Pamela Rodriguez
(74) *Attorney, Agent, or Firm* — McGlew and Tuttle, P.C.

(57) ABSTRACT

A device for adjusting the free stroke for hydraulic brakes of bicycles or motorcycles of the type including a pump assembly (4) for operating an actuator element (16), and a communication line (17) for a working fluid, set between a pump assembly and an actuator element, the device including an expansion chamber (25) set along the communication line between the pump assembly and the actuator element.

20 Claims, 2 Drawing Sheets

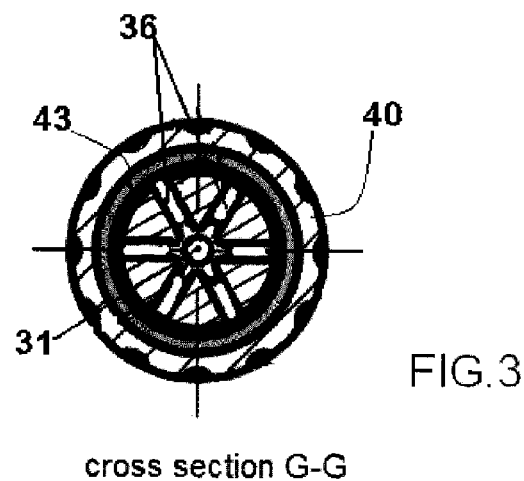
cross section G-G
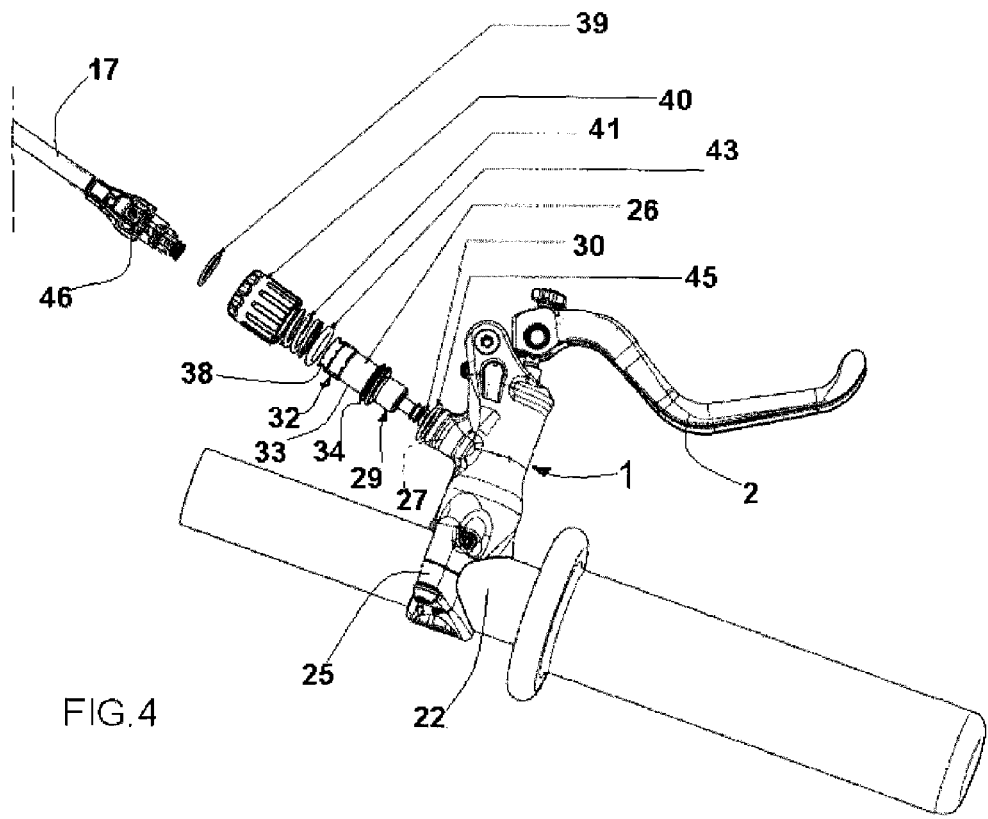

DEVICE FOR ADJUSTING THE FREE STROKE IN HYDRAULIC BRAKES OF BICYCLES OR MOTORCYCLES

FIELD OF THE INVENTION

The invention relates to a device for adjusting the free stroke of the lever in a hydraulic brake, particularly a brake for bicycles or motorcycles.

STATE OF THE ART

As is known, hydraulic brakes for bicycles are based upon the displacement of a piston governed by a lever operated by the user. The displacement of the piston pressurizes the hydraulic circuit and actuates the braking element, for example a caliper acting on a disk in the case of disk brakes.

The stroke performed by the pump piston from the resting position to the position of complete actuation is divided into two steps, the first step being referred to as "free stroke", during which the fluid of the circuit is not brought to the operating actuation pressure, and the second step being the step of actuation proper.

The passage from one step to another is defined by the relative position of the piston with respect to a hole that sets the cylinder of the brake in communication with the fluid tank.

As long as the communication between the tank and the cylinder is open, during the stroke of the piston, the fluid can pass from the cylinder to the tank, and the pressure in the cylinder does not reach the operating pressure.

As soon as the stroke of the piston manages to close the communication between the tank and the chamber of the cylinder, the piston starts to compress the fluid, and the braking step starts.

It is moreover known that the amplitude of the free stroke, in addition to merely functional purposes, has the purpose of applying upon the action of the user a delay that serves to modulate braking as well as possible, and it is advantageous for said delay to be adjustable to adapt to the characteristics or preferences of the user and/or use of the brake.

Furthermore, said adjustment enables balancing of the actions of the front and rear brakes, the difference between which depends upon the different length of the tubes for delivery of the fluid, which extend from the cylinder of the brake pump to the cylinder of the piston caliper acting on the disk.

For this purpose, devices for adjusting the free stroke have been known for some time that are based upon the variation of the relative position of the piston with respect to the communication opening in such a way as to modify the amplitude of the first step of the stroke of the piston from the resting position to the actuation position. An example of said adjustment is described in the prior patent No. IT218037.

Adjusting devices of a known type present, however, the main drawback of being tied down to the constructional solution of the pump body of the brake, i.e., of the piston/cylinder assembly and of the tank associated thereto, and of being usable only in combination with that particular constructional solution.

A further drawback of known solutions is represented by their relative complexity and difficulty of use.

AIM OF THE INVENTION

With the present invention the aim is to overcome the drawbacks of the known solutions and to propose a device for adjusting the free stroke that can be applied to hydraulic brakes of different constructional geometry, that is convenient to use, and that ensures reliable operation.

SUMMARY OF THE INVENTION

The above purposes have been achieved by providing a device for adjusting the free stroke according to the annexed claims.

A first advantage of the invention consists in the possibility of applying the device to brakes of different construction, including pre-existing brakes.

A second advantage consists in the reliability and simplicity of construction of the device.

A third advantage lies in the ease of use and in the possibility of locating the device in a position readily accessible by the user.

LIST OF DRAWINGS

The above and further advantages will be better understood by any person skilled in the branch from the ensuing description and the annexed drawings, which are represented by way of non-limiting example and in which:

FIG. 3 shows the cross section G-G of the device of FIG. 2; and

FIG. 4 is an exploded view of the device according to the invention.

DETAILED DESCRIPTION OF THE INVENTION

Figure 1:
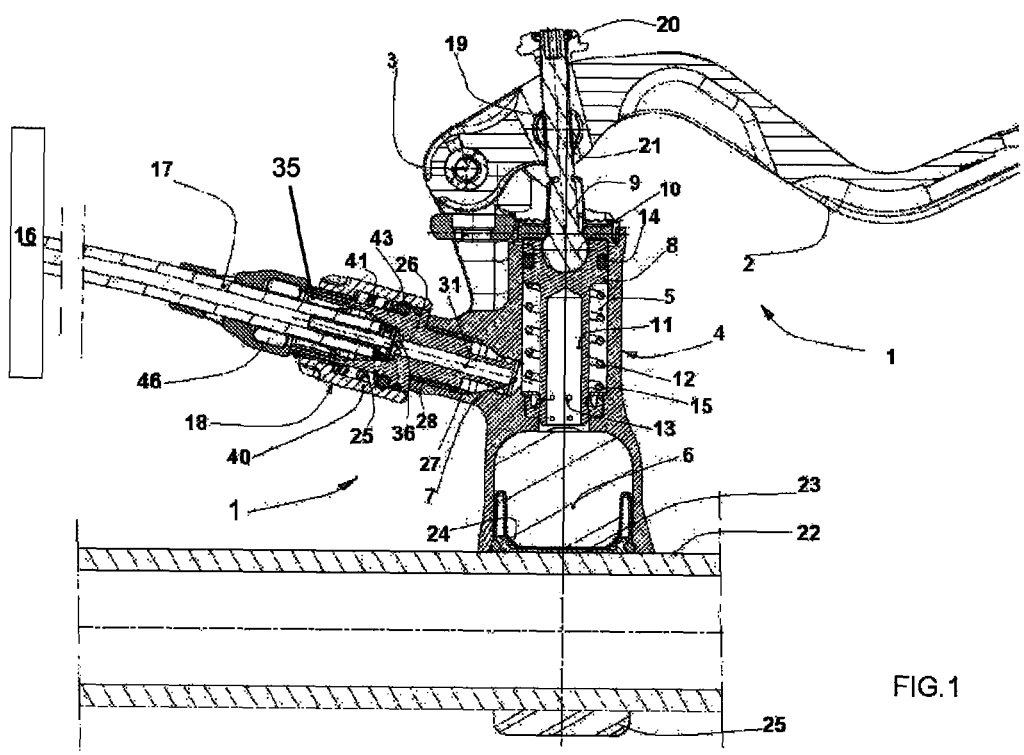
FIG. 1 shows a cross section of the device applied to a hydraulic brake for bicycles.
Figure 2:
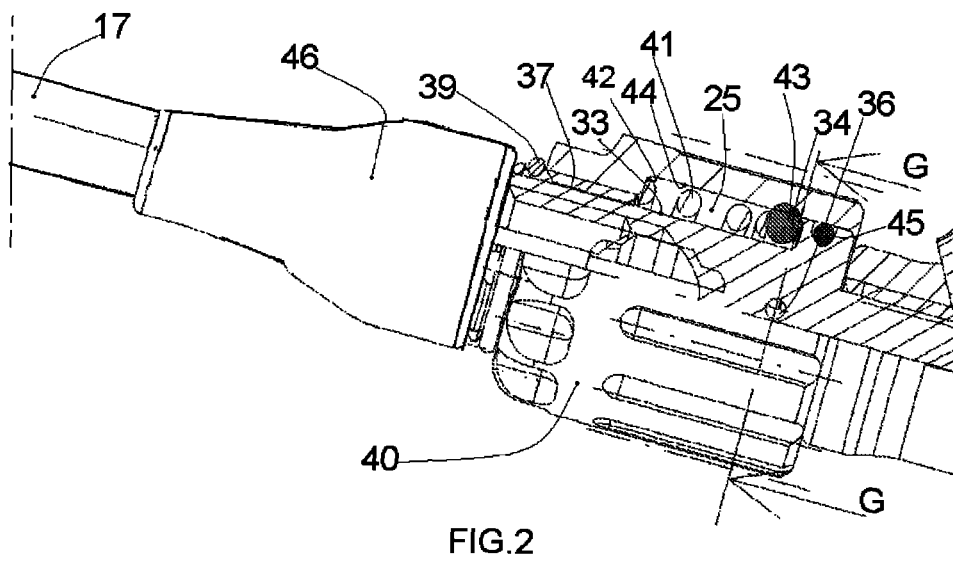
FIG. 2 is an enlarged cross-sectional view of the device.

With reference to the drawings, a device according to the invention is illustrated for adjusting the free stroke of a hydraulic brake 1.

In the example described, the brake 1 comprises an actuation lever 2, which turns about a pin 3, fixed with respect to the pump body 4 of the brake, said pump body 4 comprising a cylinder 5, which communicates with a fluid tank 6 and with an outlet 7 for the fluid pressurized by the stroke of a piston 8, which is mobile along the cylinder by action of the lever 2 via a thrust pin 9, against the action of a counteracting return spring 12.

In the case represented in the attached drawings, the tank 6 is preferably set at the distal end of the cylinder with respect to the stroke of the piston and has an opening 23, which is closed by a removable plug 24, the portion of the opening 23 in use facing and being applied to a portion of the handlebar 22, for example by means of a gripping collar 25 of a type in itself known.

The thrust pin 9 is connected to the lever 2 by means of a threaded fit 21 engaging with a transverse hole of a cylinder 19 mounted on the lever 2.

Preferably, the pin 9 can be rotated via an adjustment wheel 20 for varying the position of the lever 2, which oscillates on the pin 3 thanks to the threaded fit, according to the preferences of the user.

Once again with reference to the example illustrated in the attached drawings, the piston 8 is constituted by a hollow stem 11 and is provided, at a proximal end, with a spherical seat 10 for housing a corresponding end of the pin 9 and, at the opposite distal end, with communication holes 13 between the internal cavity of the stem 11 and the outside thereof.

Set around the proximal part of the stem 11 is a first gasket 14, which slides in a fluid-tight way along the internal wall of the cylinder 5 during the active stroke of actuation of the piston, whilst a second gasket 15 is set at the distal end of the cylinder in a fluid-tight way with respect to the outer surface of the stem 11.

In the initial resting position (FIG. 1), the active gasket 14 is set at the proximal end of the cylinder 5, and the holes 13 are in communication both with the tank 6 and with the cylinder 4.

When the lever 2 is operated, the piston starts its stroke, i.e., the step of free stroke, which continues until the stem 11 enters the tank 6 and the holes 13 are covered by the second gasket 15, thus interrupting fluid communication between the tank 6 and the cylinder 5.

From this point on, the active stroke of the piston 8 starts, with the cylinder 5 that is pressurized and the fluid that is pushed towards the outlet 7 towards the actuation element 16, for example a caliper for disk brakes connected to the pump assembly 4 via a tube 17.

According to the invention, connected at the outlet 7 of the pump assembly 4 is a device 18 for adjusting the free stroke of the pump piston 8, i.e., the extent of the stroke performed by the lever 2 starting from the initial resting position, before the working fluid is sent to the actuator 16.

The device 18 comprises a variable-volume chamber, which is set along the tube 17 in fluid communication between the pump assembly 4 and the actuator 16, preferably at the start of the tube 17, and is directly applied to the outlet 7 of the cylinder 5.

The chamber is defined by the outer surface of a valve body constituted by a hollow sleeve 26, fixed, for example with screw connection 28, to a corresponding threaded opening 27 of the outlet 7.

In greater detail, the sleeve 26 comprises a first portion 29 that can be inserted in a fluid-tight way into the opening 27 by means of a gasket 30 and that is separated by a ring 34 from a second portion 32, which is external to the opening 27 and defines an outer cylindrical surface 33. The first portion 29 of the sleeve 26 has an internal cavity 31, which communicates in use with the outlet 7 of the cylinder 5 and proceeds along the sleeve 26, widening into a second cavity 35, which extends throughout the length of the second portion 32.

In a position intermediate between the cavities 31, 35, the sleeve 26 has transverse through holes 36, which set the internal cavity 31, 35 in communication with the outer surface 33 of the second portion 32 at the ring 34.

The second portion 32 moreover has, at its outer end, 36 a thread 37 and a slot 38 for housing an O-ring 39.

The device moreover comprises an adjuster 40, which is internally threaded for engaging with the thread 37 of the sleeve 26 and for being screwed on/unscrewed off this against the action of a thrust spring 41 and slides in a fluid-tight way on the ring 34 by means of a gasket 45.

The spring 41 is housed on the outer surface 33 of the sleeve 26 between an abutment 42 of the adjuster 40 and a mobile gasket or ring 43, which slides in a fluid-tight way between the inner cylindrical surface 44 of the adjuster 40 and the surface 33 and is set between the spring 41 and the ring 34.

The outer surface 33 of the sleeve 26, the inner surface 44 and the contrast 42 of the adjuster 40, and the ring 34 define a variable-volume chamber 25, which is regulated by screwing/unscrewing the adjuster 40 along the valve body 26.

Illustrated in FIG. 4 is an exploded view of assembly of the components just described.

In a preferred embodiment, the cavity 35 is suited to housing a nozzle 46 of a fast-coupling type in itself known, for setting the tube 17 in fluid communication with the first cavity 31, said nozzle 46 terminating preferably in the proximity of the holes 36.

In operation, the device is initially in the configuration of FIG. 1, with the lever 2 in the non-operated position. In this configuration, the entire circuit is pervaded with fluid not under pressure, the tank 6 communicates with the cylinder 5 via the holes 13, and the mobile gasket 43 bears upon the ring 34.

When the lever 2 is turned to carry out braking, the piston advances, the holes 13 are covered by the gasket 15, and the cylinder 5 is pressurized.

From this point on, the pressurized fluid starts to flow through the port 5, and in succession through the cavity 31 and the holes 36, starting to push on the gasket 43. As a result of the thrust of the fluid on the gasket 43, the spring 41 starts to undergo compression up to complete filling of the chamber 25.

During filling of the chamber 25, the piston 8 continues its stroke, but the pressure of the fluid is not sufficient to operate the actuator 16.

Hence, there is a free stroke of the piston, which terminates once filling of the chamber 25 has terminated, when the fluid is pushed through the tube 17 and the actuator 16 is operated.

Upon release of the lever 2, the fluid under pressure re-enters the cylinder 5, and the spring 41 performs the reverse stroke, bringing the gasket 43 back to bear upon the ring 34.

According to the invention, by turning the adjuster 40 it is possible to increase or reduce the volume of the chamber 25 and hence the delay with which the fluid fills the chamber 25 before reaching the working pressure for operating the actuator.

Advantageously, thanks to the invention, adjustment of the free stroke of the piston in brakes or other hydraulic devices, however shaped, is extremely simple.

The device is suited to being integrated in the production of a hydraulic device or else to being inserted as accessory in a pre-existing hydraulic circuit.

Furthermore, the device thus conceived, in the embodiment illustrated, is easily accessible for the user and of extremely limited overall dimensions.

The example described refers to a hydraulic brake shaped as in the attached drawings, but it is understood that the device of the invention can be applied to hydraulic brakes otherwise devised.

The present invention has been described according to preferred embodiments, but equivalent variants may be conceived without departing from the sphere of protection of the invention.

In particular, the invention has been described with reference to the specific embodiment of the brake illustrated in the attached drawings, but it is understood that it may also be applied for adjusting the free stroke of hydraulic brakes of different conformation.

The invention claimed is:

1. A device for adjusting the free stroke for hydraulic brakes of bicycles or motorcycles of the type comprising a pump assembly for operating an actuator element and a communication line for a working fluid, which is set between said pump assembly and said actuator element, the pump assembly having a piston, the device comprising:

a variable-volume chamber, designed to be set along said communication line between said pump assembly and said actuator element;

an element mobile in response to entry of working fluid coming from an outlet of fluid from said pump assembly by effect of a stroke of the piston so as to pass from a first position in which said chamber is at least partially empty of fluid and a second position in which said chamber has been filled with an amount of fluid, in which during filling of the chamber the actuator element is not operated to define a free stroke of the piston; and a means for adjusting the volume of said chamber to be filled.

2. The device according to claim 1, wherein said chamber is constituted by a gap defined between the outer surface of a hollow cylindrical sleeve communicating with said outlet and the inner surface of a cylindrical adjuster external to the sleeve.

3. The device according to claim 2, wherein said mobile element is a ring sliding in a fluid-tight way on the sleeve along said gap, mobile between said first and second positions against the action of a return spring.

4. The device according to claim 3, wherein said sleeve has a first cavity communicating with said outlet and a second cavity communicating with the first cavity and suited to receiving a fast-coupling nozzle of said communication line.

5. The device according to claim 4, wherein said mobile element slides along said gap owing to the thrust of the fluid passing through holes for communication between said first cavity and said chamber.

6. The device according to claim 2, wherein said means for adjusting the volume are constituted by means for displacing said adjuster axially with respect to said sleeve.

7. The device according to claim 2, wherein said adjustment means are constituted by a thread between said adjuster and said sleeve.

8. The device according to claim 1, wherein said device is applied in a removable way to an outlet port of the pump assembly.

9. An hydraulic-control apparatus for bicycles and motorcycles, comprising:
a pump assembly having a piston;
a hydraulic actuator governed by said pump assembly via a communication line for a working fluid;
a device comprising a variable-volume chamber, designed to be set along said communication line between said pump assembly and said actuator, an element mobile in response to entry of working fluid coming from an outlet of fluid from said pump assembly by effect of a stroke of the piston so as to pass from a first position in which said chamber is at least partially empty of fluid and a second position in which said chamber has been filled with an amount of fluid, in which during filling of the chamber the actuator is not operated to define a free stroke of the piston, and a means for adjusting the volume of said chamber to be filled.

10. The hydraulic-control apparatus according to claim 9, wherein said chamber comprises a gap defined between the outer surface of a hollow cylindrical sleeve communicating with said outlet and the inner surface of a cylindrical adjuster external to the sleeve.

11. The hydraulic-control apparatus according to claim 10, wherein said mobile element is a ring sliding in a fluid-tight way on the sleeve along said gap, mobile between said first and second positions against the action of a return spring.

12. The hydraulic-control apparatus according to claim 10, wherein said sleeve has a first cavity communicating with said outlet and a second cavity communicating with the first cavity and suited to receiving a fast-coupling nozzle of said communication line.

13. The hydraulic-control apparatus according to claim 12, wherein said mobile ring slides along said gap owing to the thrust of the fluid passing through holes for communication between said first cavity and said chamber.

14. The hydraulic-control apparatus according to claim 10, wherein said means for adjusting the volume are constituted by means for displacing said adjuster axially with respect to said sleeve.

15. The hydraulic-control apparatus according to claim 10, wherein said adjustment means are constituted by a thread between said adjuster and said sleeve.

16. The hydraulic-control apparatus according to claim 9, wherein said device is applied in a removable way to an outlet port of the pump assembly.

17. A device for adjusting the free stroke for hydraulic brakes of bicycles or motorcycles of the type comprising a pump assembly for operating an actuator element and a communication line for a working fluid, which is set between said pump assembly and said actuator element, the device comprising:
a sleeve;
a chamber adjuster element connected to said sleeve such that said chamber adjuster element moves relative to said sleeve, at least a portion of said chamber adjuster element and at least a portion of said sleeve defining at least a portion of a variable-volume chamber set along said communication line between said pump assembly and said actuator element, wherein movement of said chamber adjuster element alters a volume of said chamber;
an element movable in response to entry of working fluid coming from an outlet of fluid from said pump assembly so as to pass from a first position in which said chamber is at least partially empty of fluid and a second position in which said chamber has been filled with an amount of fluid.

18. The device according to claim 17, wherein said sleeve is a hollow cylindrical sleeve and said sleeve is in communication with said outlet, wherein said chamber is defined by an outer surface of said sleeve and an inner surface of said chamber adjuster element.

19. The device according to claim 17, wherein said sleeve comprises sleeve threads, said adjuster comprising adjuster threads, said adjuster being movably connected to said sleeve via said sleeve threads and said adjuster threads.

20. The device according to claim 17, further comprising:
a return spring, wherein said movable element comprises a ring sliding in a fluid-tight manner on said sleeve between said first position and said second position against a force of said return spring.

* * * * *